United States Patent [19]

David

[11] 4,433,435
[45] Feb. 21, 1984

[54] ARRANGEMENT FOR REDUCING THE NOISE IN A SPEECH SIGNAL MIXED WITH NOISE

[75] Inventor: Guy A. J. David, Thiais, France

[73] Assignee: U.S. Philips Corporation, New York, N.Y.

[21] Appl. No.: 352,500

[22] Filed: Feb. 25, 1982

[30] Foreign Application Priority Data

Mar. 18, 1981 [FR] France .................................. 81 05410

[51] Int. Cl.³ .............................................. H04B 15/00
[52] U.S. Cl. ......................................... 381/94; 381/110
[58] Field of Search .................... 179/1 P, 1 D, 1 FS, 179/1 VC, 1 VL; 455/296, 307; 325/473, 478; 381/94, 110

[56] References Cited

U.S. PATENT DOCUMENTS

| | | | |
|---|---|---|---|
| 3,784,749 | 1/1974 | Shigeyama et al. | 179/1 P |
| 4,243,837 | 1/1981 | Bertholon | 381/94 |
| 4,322,579 | 3/1982 | Kleis et al. | 179/1 P X |

*Primary Examiner*—G. Z. Rubinson
*Assistant Examiner*—James L. Dwyer
*Attorney, Agent, or Firm*—Thomas A. Briody; William J. Streeter; Edward W. Goodman

[57] ABSTRACT

In order to reduce the noise signal of an acoustic origin contained in an input signal coming from a microphone located in a noisy environment, a noise reducing arrangement includes a filter (6) which receives the input signal and eliminates a frequency band of some hundreds of Hertz, centered around the average frequency of the first formant of the speech signal, a detector circuit (7) detecting the output signal of the filter (6) with a time constant to the order of some tenths of a second, finally a variable-threshold circuit (9) which uses the detected signal as the threshold signal and which is arranged for transmitting the variations of the input signal when the latter has an absolute value which is higher than the threshold signal.

6 Claims, 4 Drawing Figures

ARRANGEMENT FOR REDUCING THE NOISE IN A SPEECH SIGNAL MIXED WITH NOISE

BACKGROUND OF THE INVENTION

The invention relates to an arrangement for reducing the noise in an input signal formed by a speech signal mixed with noise.

Such an arrangement can be used to improve the listening comfort in telephone communication between two speakers located in a noisy environment. The microphone of each speaker produces a signal owing to acoustic noise which mixes with the speech signal during intersyllabic silences in the conversation and which may render it very difficult for the other speaker to hear what is said.

The listening comfort is already improved in communication systems which use automatic alternating control. In these systems a speech discriminator arrangement controls the switching circuits in such a manner that the connection between the microphone of one speaker and the receiver of the other speaker is not established until a speech signal is detected in the signal from the microphone. An arrangement of this type is described in, for example, the U.S. Pat. No. 4,243,837. But it should be noted that the automatic alternating control, which prevents that during the silent period one speaker hears the acoustic noise caught by the microphone of the other speaker, does not accomplish any improvement, during the conversation, for the speaker who listens to the other speaker who is speaking in a noisy environment; this speaker still hears acoustic noise superposed on the speech of the other speaker, particularly during the intersyllabic silences.

SUMMARY OF THE INVENTION

The present invention has for its object to improve the listening comfort by reducing the noise signal of acoustic origin which mixes with a speech signal not only during the periods of silence, but also during the periods of speech.

According to the invention, this noise reduction arrangement is characterized in that it comprises a band-stop filter which receives the input signal and eliminates a frequency band which is approximately centered around the average frequency of the first formant of the speech signal and which covers at least a portion of the frequency band of this first formant, a detection circuit detecting the output signal of the band-stop filter with a long time constant to the order of the time constant of the variation of the average noise level, finally a variable-threshold circuit to which a threshold signal is applied which is formed from the detected signal and which is arranged for transmitting the variation of the input signal when the absolute value of said last-mentioned signal is higher than the said threshold signal.

With the arrangement in accordance with the invention, the signal produced by the detection circuit correctly represents the average level of the acoustic noise and the variable-threshold circuit transmits only the variations of the signals higher than this average noise level and particularly the variations of the speech signals during the speech period.

In order to substantially suppress the effect of a certain amplitude distortion produced in the speech signal by the variable-threshold circuit, it is advantageous for this variable-threshold circuit to be followed by a low-pass filter which eliminates the frequencies above the normal frequencies of the speech signals.

DESCRIPTION OF THE DRAWING

By means of the following description which is given by way of example with reference to the accompanying drawing, it will be better understood how the invention can be put into effect.

DESCRIPTION OF THE PREFERRED EMBODIMENT

Figure 1:
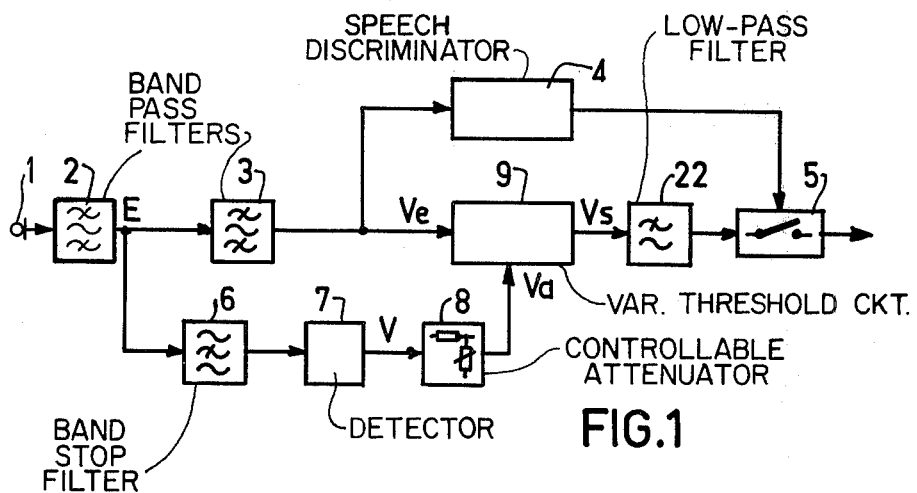
FIG. 1 shows a circuit diagram of the arrangement in accordance with the invention.

FIG. 1 shows a microphone 1 which, located in a noisy environment, produces a noise signal of acoustic origin which mixes with the speech signal produced by a speaker speaking in front of the microphone. The band-pass filter 2 represents the effect of filtering excercised by the microphone itself and by an amplifier which may be arranged behind the microphone. The filter 2 produces a signal E which covers, for example, a frequency band from 50 to 4000 Hz and is the input signal processed by the noise reduction arrangement of the invention. This filter 3 limits the band of the input signal E to a band which is normal for speech signals, that is to say to, for example, 300–3000 Hz. An acoustic noise signal which is caught by the microphone 1 is mixed with the speech signal in the signal Ve supplied by the filter 3. If the signal Ve is directly transmitted to the far-end speaker the latter may be in a circumstance in which it is difficult to perceive the speech. In communication systems utilizing automatic alternating control, this situation is improved to a certain extent. As is schematically shown in the Figure, a speech discriminator arrangement 4 is now used which produces, from the signal Ve supplied by the filter 3, a logic control signal for the circuit breaker 5. This circuit breaker 5 may cut-off or establish the transmission of the signal Ve to the far-end speaker. The arrangement 4 detects the presence of speech in the signal Ve and does not order the circuit breaker 5 to close until a speech signal is present. It will be obvious that in this manner, when the local speaker who is in front of the microphone 1 does not speak, the far-end speaker does not receive any noise of an acoustic origin caught by the microphone 1, whereas in the opposite situation this far-end speaker perceives the noise which superposes itself on the speech, which may be very annoying.

The present invention has for its object to provide in all cases, that is to say with or without automatic alternating control, an improvement in the listening comfort of the far-end speaker by reducing the noise signal of acoustic origin in the transmitted signal.

The noise reduction arrangement in accordance with the invention comprises a band-stop filter 6 which receives the input signal E and which eliminates a frequency band which is approximately centered around the mean frequency of the first formant of the speech signal and covers at least a portion of the frequency band of this first formant. It is known that the formants of the speech signal are frequency bands in which the energy is concentrated more particularly, the major portion of the energy of the speech signal is concentrated in the first formant which occupies approximately the frequency band from 300–1000 Hz, this concentration being at its maximum near the mean frequency of this first formant. The band eliminated by the filter 6 may, for example, be the band from 550–750 Hz, centered around the mean frequency of 650 Hz of the first formant.

The signal supplied by the filter 6 is applied to a detector circuit 7 which in customary manner is formed by a rectifier circuit and a low-pass filter, not shown. The low-pass filter is provided in order to produce in the detector circuit a long time constant to the order of magnitude of the constant of the time variation of the average level of the noise of acoustic origin caught by the microphone 1. It is known that, because of the several echoes, an acoustic noise generally has the character of a continuous sound of a slowly variable intensity with a time constant to the order of a few tenths of a second. In this respect an acoustic noise differs from a word, which, in contrast therewith, has a discontinuous character, with significant intensity variations in some milliseconds in each syllable. As was also the case for the signal applied to the detector 7, a large portion of the energy of the speech signal has already been removed, owing to the band-pass filter 6, and as the detector circuit 7 detects its input signal with a long time constant to the order of, for example, from 0.2 to 0.5 S, the speech signal is substantially not taken in account by the detector circuit 7 and the latter produces a detected signal V which varies slowly and represents the average level of the noise of acoustic origin captured by the microphone 1 outside the frequency band eliminated by the band stop filter 6. As this noise has an energy which is approximately uniformly distributed over the frequency range and as the eliminated frequency band is rather narrow, the detected signal V actually represents rather correctly the average level of the total acoustic noise.

The detected signal V is applied to a controllable attenuation circuit 8 to provide the threshold signal Va which is used in the variable-threshold circuit 9. This variable-threshold circuit 9 receives the signal Ve which is limited to the speech signal band by the filter 3. The attenuating circuit 8 is controlled in such a manner that the detected signal V is adjusted to a level Va, which is representative of the average level of the noise in the pass-band of the filter 3, in order to take the difference between the frequency bands transmitted by the filter 6 and 3, the transmission coefficients of which may be different, and the attenuation caused by the detector 7 simultaneously into account. It will be obvious that in certain cases the attenuating circuit 8 may be replaced by an amplifier. As will become apparent from the description of the operation of the controllable threshold circuit 9, a practical means of controlling the circuit 8 is to adjust the output signal $V_s$ of the circuit 9 to a value close to zero in the absence of the speech signal in the signal Ve.

Figure 2:
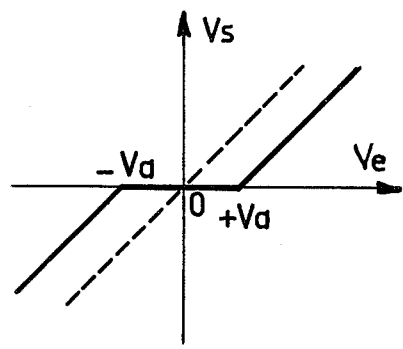
FIG. 2 is a diagram showing the characteristic of the variable-threshold circuit used in the arrangement in accordance with the invention.
Figure 3:
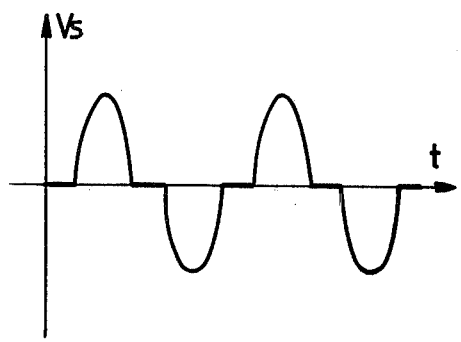
FIG. 3 is a diagram which shows the response of a variable-threshold circuit to a sinusoidal input signal.

The output signal $V_s$ of the circuit 9 depends on the signal Ve at its input and on the threshold signal Va in accordance with the characteristic represented by the angular curve in FIG. 2. This characteristic shows that the variable threshold circuit 9 does not transmit the variations of the signal Ve when the values of the latter are between $-Va$ and $+Va$; it transmits the variation of the signal Ve when the values of the latter are higher than $+Va$ and lower than $-Va$. For the case in which the threshold signal Va is cancelled, that is to say in the absence of the noise signal, the characteristic changes into the broken straight line passing through the origin. The curve of the FIG. 3 shows, for example, the signal $V_s$ which is obtained at the output of the threshold circuit 9, by applying to it a threshold signal Va which differs from zero and a sinusoidial signal Ve.

Thus, owing to the fact that the variable-threshold circuit 9 has the characteristic of FIG. 2, the portion of the noise of acoustic origin which is below the average level of the noise represented by the threshold signal Va is substantially eliminated from the signal Ve, both during the silent periods and during the speech periods. It is obvious that it is desirable to control the threshold signal Va by the control circuit 8 in such a way that the noise signal is just eliminated; in practice this can be accomplished by adjusting the signal $V_s$ during the silent periods to a value close to zero. The variations of the speech signal below the average noise level are also eliminated, but as a speaker, speaking before a microphone in a noisy atmosphere, has a tendency to speak louder accordingly as the ambient noise is stronger in order to surpass this noise, the threshold circuit 9 will generally transmit considerable variations in the speech signals above the average noise level. In order to substantially eliminate the effect of the distortion produced by the variable-threshold circuit 9 in the speech signal, it is advantageous to provide at the output of this circuit a low-pass filter 22 which limits the band of the signal $V_s$ to the maximum frequency of 3000 Hz of the speech signals. Finally, thanks to the reduction in the acoustic noise signal which the arrangement in accordance with the invention achieves, the listening comfort for the far-end speaker is considerably improved while the residual amplitude distortion of the speech signal accompanying this noise reduction does not entail any substantial loss of intelligibility, for the essence of the vocal information is contained in the frequency range.

In the foregoing it has been mentioned, by way of example, that the band-stop filter 6 can eliminate a frequency band from 550 to 750 Hz. It has been found that this comparatively narrow band is satisfactory when the acoustic noise signal has a significant level, while when this noise level is much lower, it is advantageous to increase the frequency band eliminated by the filter 6.

Figure 4:
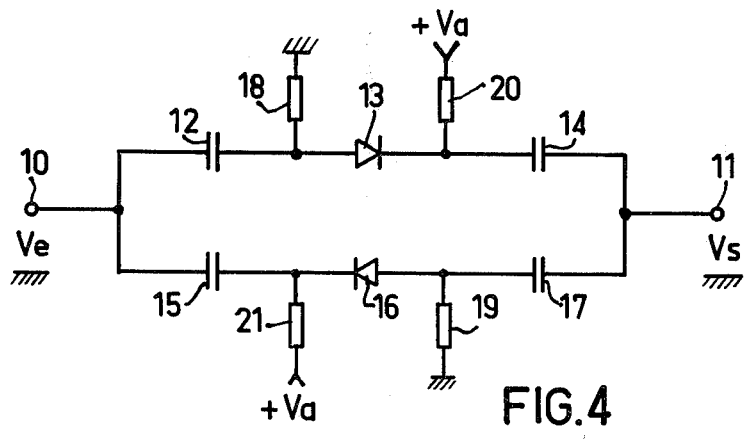
FIG. 4 is a circuit diagram of an embodiment of the variable-threshold circuit.

FIG. 4 shows a circuit diagram of a possible embodiment of the variable-threshold circuit 9. The signal Ve is applied between the input terminal and ground and the output signal $V_s$ of the circuit is recovered between the output terminal 11 and ground. A series arrangement of a coupling capacitor 12, a diode 13 and a coupling capacitor 14, on the one hand, and a series arrangement of a coupling capacitor 15, a diode 16 and a coupling capacitor 17, on the other hand, are connected between the terminal 10 and terminal 11. The anode of the diode 13 is arranged near the terminal 10 while the anode of the diode 14 is arranged near the terminal 11. The anodes of the diodes 13 and 16 are connected to ground via respective resistors 18 and 19. The cathodes of the diodes 13 and 16 receive the threshold voltage $+Va$ via respective resistor 20 and 21. The voltage drop across the diodes 13 and 16 will be disregarded in the following description. It is easy to see that the diode 13 is rendered non-conductive when the voltage Ve is lower than $+Va$ and that the diode 16 is rendered non-conductive when the voltage Ve is above $-Va$. From this it can be derived that when the voltage Ve is between $-Va$ and $+Va$, the two diodes 13 and 16 are cut off and the voltage Ve is not conveyed to the output terminal 11. When the voltage Ve is higher than $+Va$ the diode 16 is cutoff, diode 13 is conductive and the voltage difference $Ve-Va$ is conveyed to the output terminal 11. When the voltage Ve is below $-Va$ the diode 13 is cutoff, the diode 16 is conductive and the voltage difference $Ve-(-Va)$ is transmitted to the terminal 11. This mode of operation corresponds to the characteristic shown in FIG. 2.

What is claimed is:

1. An arrangement for reducing the noise in an input signal formed by a speech signal mixed with noise, characterized in that the arrangement comprises a band-stop filter which receives the input signal and eliminates a frequency band which is approximately centered around the average frequency of the first formant of the speech signal and which covers at least a portion of the frequency band of the first format, a detection circuit for detecting the level of the output signal of the band-stop filter, said detection circuit having a long time constant to the order of the time constant of the variation of the average noise level, and a variable-threshold circuit to which a threshold signal is applied, said threshold signal being formed from the detected signal and which is arranged for transmitting the variation of the input signal when the absolute value of said input signal is higher than the threshold level.

2. An arrangement as claimed in claim 1, characterized in that the threshold signal is formed at the output of a circuit for controlling the amplitude of the detected signal, this circuit being controlled in such a manner that in the absence of the speech signal, the signal transmitted by the variable threshold circuit is close to zero.

3. An arrangement as claimed in claim 1 or claim 2, characterized in that the signal supplied by the variable-threshold circuit is applied, before being transmitted, to a low-pass filter which cuts the frequencies higher than the frequency band of the speech signals.

4. An arrangement as claimed in claim 1 or 2, characterized in that the frequency band eliminated by the band-stop filter is centered around 650 Hz and has a width of some hundreds of Hz.

5. An arrangement as claimed in claim 1 or 2, characterized in that the time constant of the detector circuit is in the order of some tenths of a second.

6. An arrangement as claimed in claim 1 or 2, characterized in that the variable-threshold circuit comprises two two diodes which are arranged in parallel with opposite conductivity directions between an input terminal and an output terminal of the variable threshold circuit by means of respective coupling capacitors, these diodes being polarized by means of the threshold signal in such a manner that one diode is cut-off when the input signal is below the value Va of the threshold signal and that the other diode is cut-off when the input signal is higher than the value $-Va$ of the threshold signal which has a negative polarity.

* * * * *